No. 698,688. Patented Apr. 29, 1902.
T. DUNCAN.
INDUCTION MOTOR METER.
(Application filed Jan. 29, 1900.)

(No Model.) 4 Sheets—Sheet 1.

WITNESSES:
Samuel R. Bachtel
Charles E. Stuart

INVENTOR.
THOMAS DUNCAN
BY Charles A. Brown & Cragg
ATTORNEYS.

No. 698,688. Patented Apr. 29, 1902.
T. DUNCAN.
INDUCTION MOTOR METER.
(Application filed Jan. 29, 1900.)
(No Model.) 4 Sheets—Sheet 2.

WITNESSES:

INVENTOR.
THOMAS DUNCAN
BY
ATTORNEYS.

No. 698,688. Patented Apr. 29, 1902.
T. DUNCAN.
INDUCTION MOTOR METER.
(Application filed Jan. 29, 1900.)

(No Model.) 4 Sheets—Sheet 4.

WITNESSES:
INVENTOR.
THOMAS DUNCAN
BY
ATTORNEYS.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

INDUCTION MOTOR-METER.

SPECIFICATION forming part of Letters Patent No. 698,688, dated April 29, 1902.

Application filed January 29, 1900. Serial No. 3,161. (No model.)

*To all whom it may concern:*

Be it known that I, THOMAS DUNCAN, a citizen of the United States, residing at Chicago, in the county of Cook and State of Illinois, have invented a certain new and useful Improvement in Induction Motor-Meters, (Case No. 354,) of which the following is a full, clear, concise, and exact description, reference being had to the accompanying drawings, forming a part of this specification.

My invention relates to induction motor-meters, and more particularly to that class of such meters known as "integrating Coulomb meters." In induction motor-meters of this class the torque of the armature of the meter varies as the square of the current, and consequently the retarding force which must be applied to the armature to make its rotation conform to the flow of the current must vary as the square of the speed. This requirement is met by the movement of a body in liquid, the resistance to such a body being, except at slow speed, as is well known, proportional to the square of the speed. I take advantage of this law in carrying out my present invention, and I aim to secure by the improvements hereinafter set forth a reduction in cost over that of meters at present in use and at the same time to secure a meter which will be simple in its mechanism and easily taken apart for inspection, cleaning, and repair. Other advantages which result from the construction of my present invention are the slow speed with which the motor may be run, while at the same time a strong torque and strong retardation make the meter positive and reliable in its action. The retardation is effected without the use of vanes or magnets or any auxiliary devices, such as are ordinarily employed.

Another feature of my invention is in the construction of the cores of the magnets, which are made of laminæ punched from blanks and so formed that there is no waste iron left from the punchings.

I will describe my invention more particularly by reference to the accompanying drawings, in which—

Figure 1:
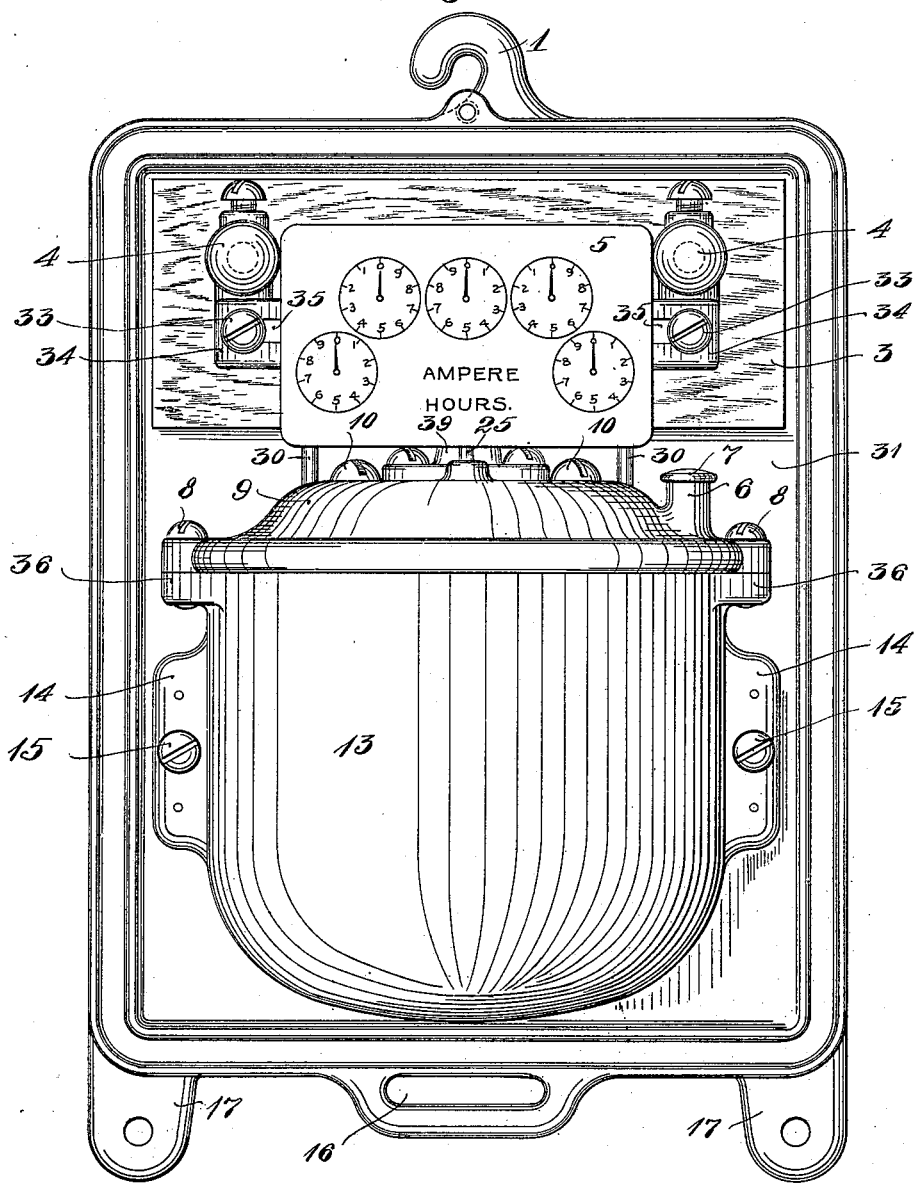
Figure 2:
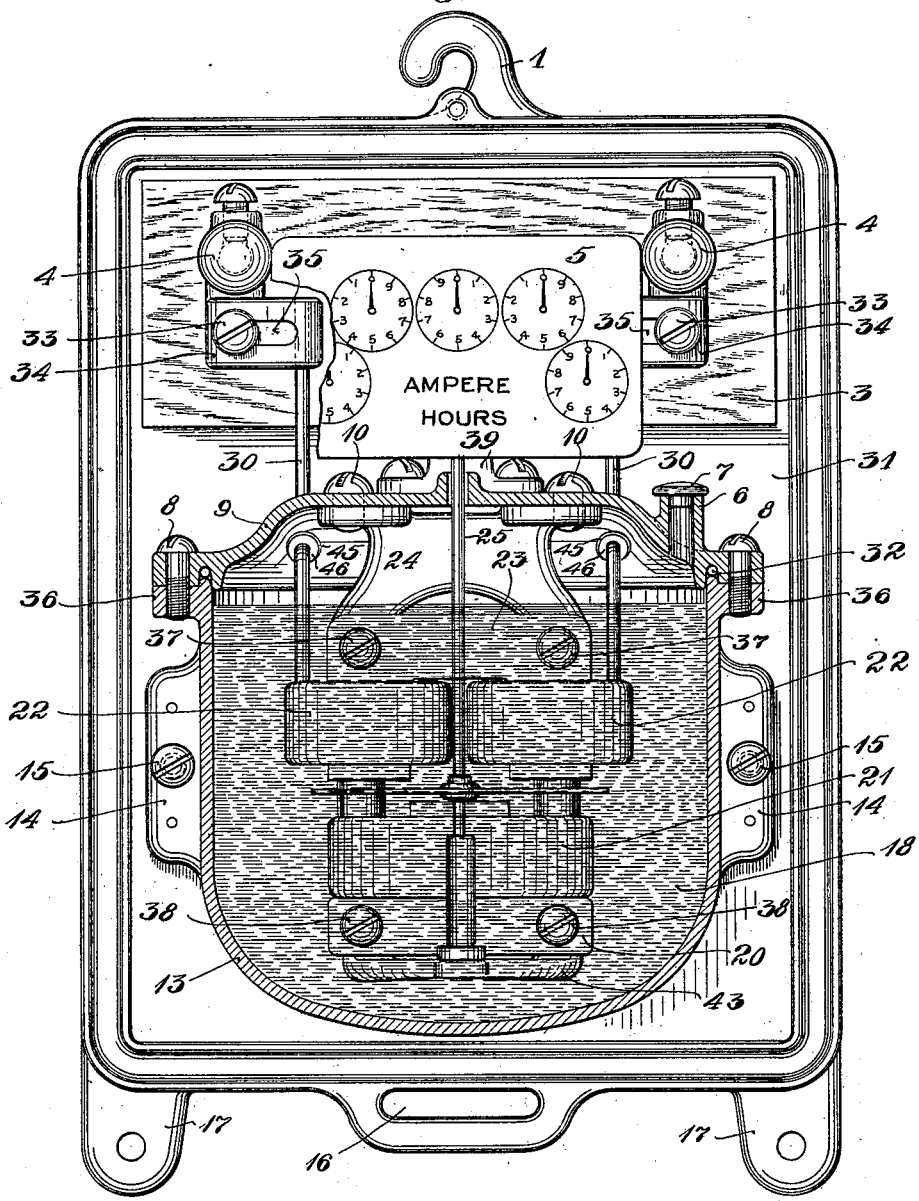
Figure 3:
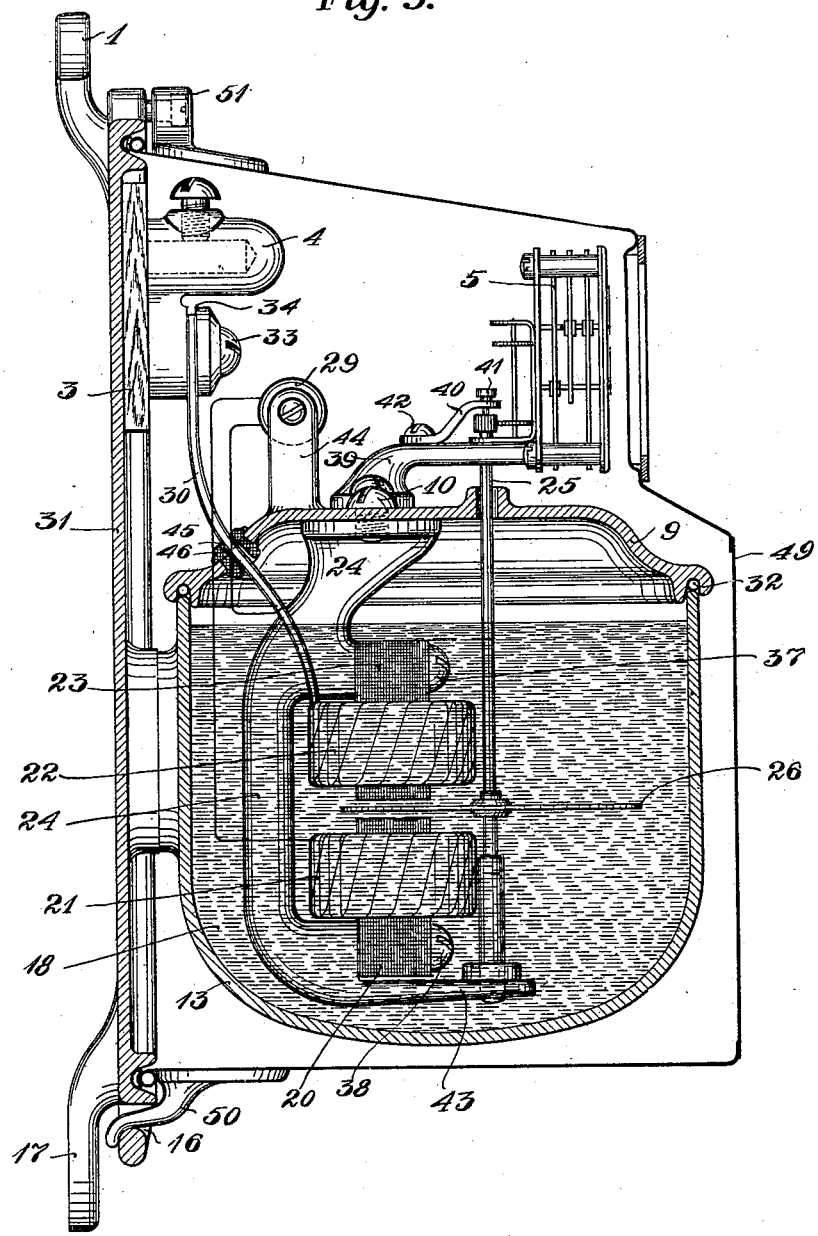
Figure 4:
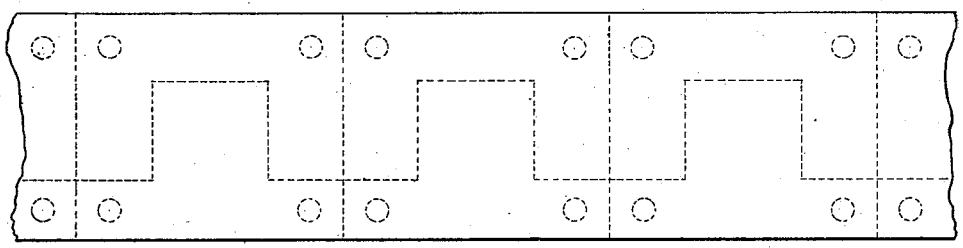
Figure 5:
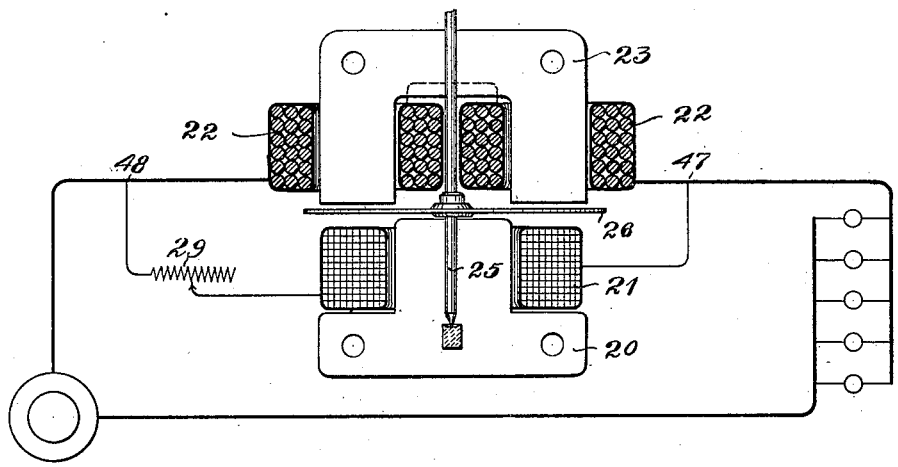
Figure 6:
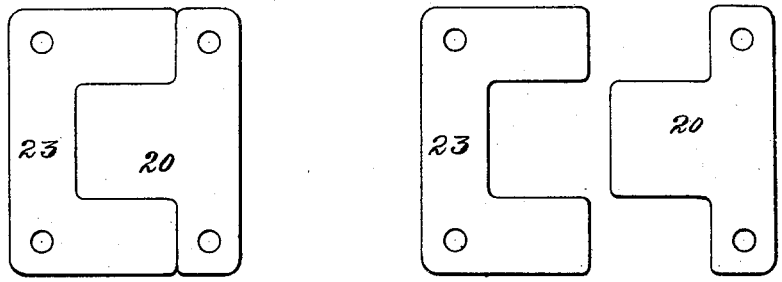

Figure 1 is a front elevation of the complete meter of my invention. Fig. 2 is a view similar to Fig. 1, but with the retaining-case in section and a part of the counting mechanism removed to show the connection. Fig. 3 is a sectional view of the meter at right angles to that of Fig. 2. Fig. 4 represents the blanks from which the laminæ forming the magnet-cores are punched. Fig. 5 is a diagrammatic representation of my invention and its circuit connections. Fig. 6 shows the punchings which form the magnetic circuits.

Like characters of reference are used to designate like parts throughout the different views.

The back or supporting-frame 31, preferably of cast metal, carries the insulating-strip 3, which is secured thereto. Upon this insulating-strip are mounted the binding-posts 4 4, by means of which the meter is connected with the source of current and the translating devices, respectively. A receptacle 13, preferably of cast metal, is held upon the back 31 by the lugs 14, which are preferably formed integral with the receptacle and through which the screws 15 15 pass to secure the receptacle to the base. This receptacle 13 is cup-shaped and is provided with a lid 9, which fits closely upon the rim of said receptacle. Lugs 36 36 are provided upon the upper rim of said receptacle, and registering therewith are similar extensions or lugs upon the lid. The screws 8 8, passing through these extensions or lugs upon the lids, screw into the threaded holes in the lugs 36 36 upon the receptacle, thereby securing the lid firmly in position. A rubber gasket 32 makes the joint between the lid and the receptacle dust-proof and also effectually prevents the liquid 18, with which the receptacle is filled, from spilling or leaking out. In the lid or cap 9 is a portion 6, preferably cast integral with said lid and provided with a small cap 7, which closes the opening through said portion 6. This opening through the lid affords a means for filling the receptacle with oil, which is preferably done after the meter is in place, after which the cap 7 is fastened over the opening, thereby sealing the receptacle. The support 24 is preferably of metal and screwed to the cap 9 by means of the screws 10 10. This support 24 carries the series field-coils 22 and their laminated iron core 23. It also carries, by means of the lower extension thereof, the shunt field-coil 21 and the laminated iron core thereof, 20, the cores being fastened to the support by screws 37 37 38 38. Upon the lid or cap 9 the arm 39 is screwed and supports the registering-train, which is of well-known form and need not be further described. The arm 39 is provided with the piece 40, which carries the adjustable bearing 41 and is screwed to the arm 39 by a screw 42. It results from this construction that the registering-train, the coils, including the armature and the spindle thereof, which is supported by the extension 43 of the support 24, and the upper end of which extending through a hole in the lid rests in the bearing 41, are attached to the lid or cap 9. By removing the screws 8 8 the lid or cap can be removed, carrying therewith the registering-train 5, the support 24, the coils 21 22, the cores 20 23, the spindle 25, the disk armature 26, and the resistance 29. This resistance 29 is mounted upon a pillar 44 upon the lid or cap and is adapted to be connected in circuit with the coil 21, as shown in Fig. 5. I make this resistance adjustable and may secure adjustment of current strength and phase thereby in a well-known way, which I do not deem it necessary to further describe, as it will be readily understood by those skilled in the art without detailed description. Connection with the series coils 22 is attained through the wires 30 30, which pass through holes in the lid 45 45, in which are fastened the bushings 46 46, preferably of insulating material. The upper ends of the wires 30 30 are adapted to be held in clamps 34, which are tightened upon the wires by means of the screws 33. In order to loosen the wires before removing the cap 9 and the parts attached thereto, screws 33 are loosened, when the clamp 34 can be moved laterally by means of the slot 35, which will result in exposing the series wires and permitting them to be lifted away from the binding-posts without difficulty. The clamps 34 rest against a supporting-plate, which is fastened to an upright support 4, the series wires being clamped between the said clamp and the said support. The screws 33 serve to press the clamps 34 closely against the supporting-plate, thereby holding the wires firmly in place. In order to remove the series wires without completely unscrewing the screw 33, I provide slots 35, which permit of displacing the clamp laterally, so that the wires may be readily removed. The coil 21 is connected in a shunt to the series coil, the shunt-circuit being attached to the series circuit at 47 upon one side and 48 upon the other side of the coil and including within this shunt-circuit the coil 21 and the resistance 29, which I use to adjust the phase and strength of current in the coils in order to determine the proper speed of the armature.

The disk armature is made of aluminium, preferably, or other good conducting metal. The receptacle 13 is preferably filled with a good quality of mineral oil. This affords insulation to the circuit and also preserves the parts immersed therein. The necessary retarding effect upon the armature is obtained by the rotation of the armature in the oil.

In Fig. 4 I have shown a continuous strip of iron, which constitutes the blank from which the punchings 20 and 23 are struck. The punch cuts the metal on the dotted lines, as shown in Fig. 4, and, as shown in Figs. 5 and 6, the construction of the meter-coils upon these punchings as cores will be readily understood. It will be seen that there is practically no waste from these punchings, one of each of said punchings being U-shaped and providing the arms upon which the coils 22 22 are wound. The other of said punchings is T-shaped and provides the core upon which the coil 21 is wound.

Inclosing the entire meter is provided the usual cover 49, provided with the ear 50, adapted to engage with the slot 16 upon the under side of the meter, and provided at the upper side with the lug 51, through which a screw may be passed to fasten the hood to the back. The hook 1 and the lugs 17 17, provided with screw-holes, are used in the ordinary way to fasten the complete meter upon the wall.

The construction which I have described furnishes a meter which is simple and compact in structure, efficient and reliable in operation, easy of access, and very durable. No additional torque is needed to secure a speed proportional to the current beyond that afforded by the motion of the armature in the oil, which provides a retarding effect proportional to the square of the speed, and thus secures a rotation of the armature proportional to the flow of the current, the torque upon the armature being proportional to the square of the current.

At very slow speeds the law of resistance of liquid to the motion of a body therein changes, and this resistance becomes proportional directly to the speed. The construction hereinbefore described takes advantage of this change, which enables the meter to measure light loads accurately, notwithstanding the relatively greater effect of friction at small loads. The greatly-reduced resistance to the motion by the liquid at very slow speeds may be made to compensate for the increased resistance due to friction, so that I can get a perfectly accurate measurement of the current from the lightest load to the full capacity of the meter, a result not heretofore accomplished with meters of this class.

Various modifications of my invention in the matter of details may be made without departing from the spirit of my invention, and I therefore do not desire to be limited to the precise construction shown; but, Having described my invention, what I claim as new, and desire to secure by Letters Patent, is—

1. In a meter of the class described, the combination with a support for all the moving parts of the motor, of lead-wires from the motor-coils, clamps adapted to clasp said lead-wires and to be loosened and moved away therefrom, and binding-posts to which said clamps are attached, substantially as described.

2. In a meter of the class described, the combination with the frame 31, of the insulating-strip 3 secured thereto, receptacle 13 also attached to said frame, a lid 9 for said receptacle, coils, armature and registering-train carried by said lid, binding-posts supported upon said insulating-strip for connecting the meter with the circuit-conductor, and means for detachably connecting the wires leading to the meter-coils with said binding-posts, substantially as described.

In witness whereof I hereunto subscribe my name this 22d day of January, A. D. 1900.

THOMAS DUNCAN.

Witnesses:
WILLIAM F. MEYER,
DAYTON N. PETTIT.